UNITED STATES PATENT OFFICE.

CARLETON ELLIS, OF WHITE PLAINS, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

985,405.      Specification of Letters Patent.      Patented Feb. 28, 1911.

No Drawing.      Application filed March 30, 1907. Serial No. 365,483.

*To all whom it may concern:*

Be it known that I, CARLETON ELLIS, a citizen of the United States, and resident of White Plains, in the county of Westchester and State of New York, have made certain new and useful Improvements Relating to Paint or Varnish Removers, of which the following is a specification.

This invention relates to paint or varnish removers and relates especially to removers comprising volatile organic solvent material combined with crystalline organic solid material to retard the evaporation thereof. Many crystalline evaporation retarding organic bodies may be used in this way, including the chlornaphthalenes, camphors and other solid terpene bodies of a non-resinous characer or acetanilid, adipic acid, amido benzoic acid, betol, benzonaphthol, beta naphthol, menthol, acetophenone, oleic ozonids, that is the bodies formed by the reaction of ozone on oleic acid, naphthalene, and derivatives, such as phenyl salicylate, calcium salicylate, aluminum benzoate, as well as other bodies of the aliphathic and aromatic series. Many of these bodies decrease the inflammability of volatile solvent removers by reducing the vapor tension and some of these illustrative retarding agents, such as the chlornaphthalenes are non-inflammable.

Suitable penetrating finish solvent material may be employed, that is, solvent material of a generally benzolic character or action in removers such as benzol and its homologues, toluol, xylol, mesitylene, cumene, etc., and their commercial forms, such as commercial toluol and also the somewhat analogous petroleum hydrocarbons, such as naphtha and benzin as well as carbon-bisulfid, turpentine, wood turpentine, carbon-tetrachlorid and other chlorinated solvents, such as chlorbenzol, dichlorhydrin and epichlorhydrin.

Suitable loosening finish solvent material may also be used, that is, solvents of a generally alcoholic character or action in removers, such as methyl, ethyl, propyl, butyl, amyl, allyl and other strict alcohols, preferably in their commercial forms, including denatured alcohol or their esters derived from combination with acetic, carbonic, butyric, propionic, formic, carbolic, cresylic, lactic, citric and other acids. Many ketonic bodies having a generally alcoholic character or action may also be used, such as methyl ethyl ketone, ethyl butyl ketone, oil of acetone, acetone and its condensation derivatives, mesityl oxid, phorone, xylitone and isoxylitone as well as methyl acetone and the secondary and tertiary alcohols and their derivatives.

Although not necessary in all cases it is usually desirable to employ in the remover, in addition to the crystalline organic evaporation retarding material other suitable stiffening material, such as wood flour, starch, whiting, infusorial earth and soapy or waxy bodies, such as ceresin, paraffin, bayberry tallow, beeswax, ozocerite, tar oil and the like. All of the ingredients are preferably thoroughly incorporated by agitation at the desired moderate heat, the stiffening material being preferably first incorporated with the more energetic solvents, although this is not always necessary. An illustrative remover of this character may comprise ethyl citrate 10 gallons, terpineol 5 gallons, gasolene 5 gallons, denatured alcohol 10 gallons, wood flour 15 pounds and chlornapthalene 45 pounds. Another remover may comprise allyl alcohol 10 gallons, camphor 5 pounds, paraffin 3 pounds and wood flour 8 pounds. Another remover may comprise denatured alcohol 15 gallons, acetone 10 gallons, benzol 10 gallons, benzin 5 gallons and beta naphthol 30 pounds. Another remover adapted for removing shellac and similar finish may comprise wood alcohol 12 gallons, terpineol 10 gallons, naphthalene 5 pounds and ceresin 2 pounds, although the wood alcohol is not necessary when the remover is used on other finishes. Another remover may comprise terpineol 10 gallons combined with chlornaphthalene 7 pounds. Still another illustrative remover may comprise terpineol 8 gallons, acetone 6 gallons and benzophenone 9 pounds.

This invention has been described in connection with a number of illustrative ingredients, formulas, proportions and processes, to the details of which disclosure the invention is not, of course, to be limited.

What is claimed is:—

1. The finish remover comprising approximately ethyl citrate 10 gallons, terpineol 5 gallons, gasolene 5 gallons, denatured alcohol 10 gallons, wood flour 15 pounds, and chlornaphthalene 45 pounds.

2. The finish remover comprising approximately ethyl citrate 10 gallons, denatured alcohol 10 gallons, terpineol 5 gallons, gasolene 5 gallons and stiffening material comprising chlornapthalene 60 pounds.

3. The finish remover comprising loosening solvent material including ethyl citrate, penetrating finish solvent material and stiffening material including chlornaphthalene.

4. The finish remover comprising organic finish solvent material including terpineol and stiffening material including chlornaphthalene.

5. The finish remover comprising organic finish solvent material including loosening material and terpineol and incorporated stiffening material.

6. The finish remover comprising finish solvent material including terpineol and incorporated stiffening material.

7. The finish remover comprising finish solvent material including penetrating solvent material and stiffening material including chlornaphthalene.

8. The finish remover comprising organic finish solvent material and stiffening material including chlornaphthalene.

9. The substantially fluent finish remover consisting in larger part of composite organic finish solvent material including terpineol and dissolved chlorinated stiffening material.

10. The finish remover comprising finish solvent material and crystalline organic solid evaporation retarding material of a chlornaphthalene order.

CARLETON ELLIS.

Witnesses:
JOSEPH J. COLLINS,
JESSIE B. KAY.